Aug. 1, 1967

A. T. ZAPPIA 3,333,938

GLASS FEEDER SCOOP GEAR INDEX MECHANISM

Filed Dec. 30, 1965

INVENTOR.
ANTHONY T. ZAPPIA

BY Hood, Gust & Irish
Attorneys

Aug. 1, 1967  A. T. ZAPPIA  3,333,938
GLASS FEEDER SCOOP GEAR INDEX MECHANISM
Filed Dec. 30, 1965  2 Sheets-Sheet 2
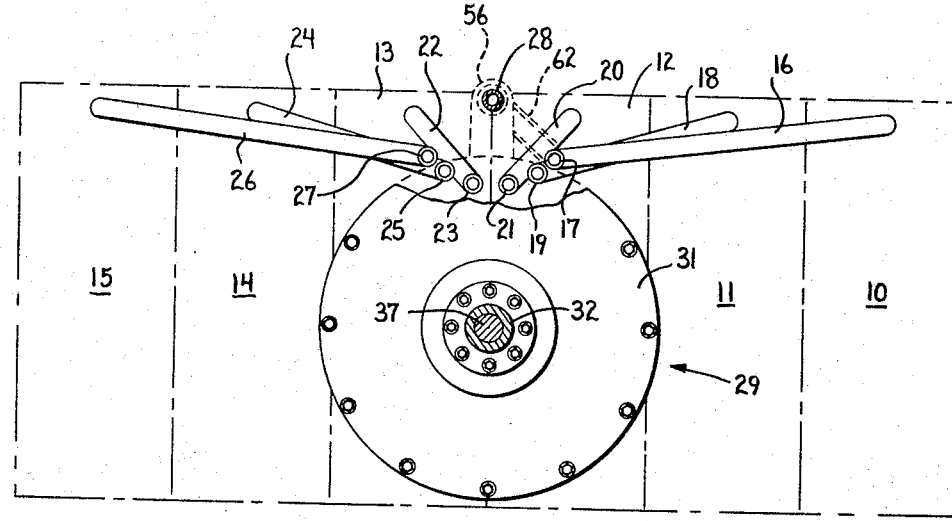
Fig. 3.
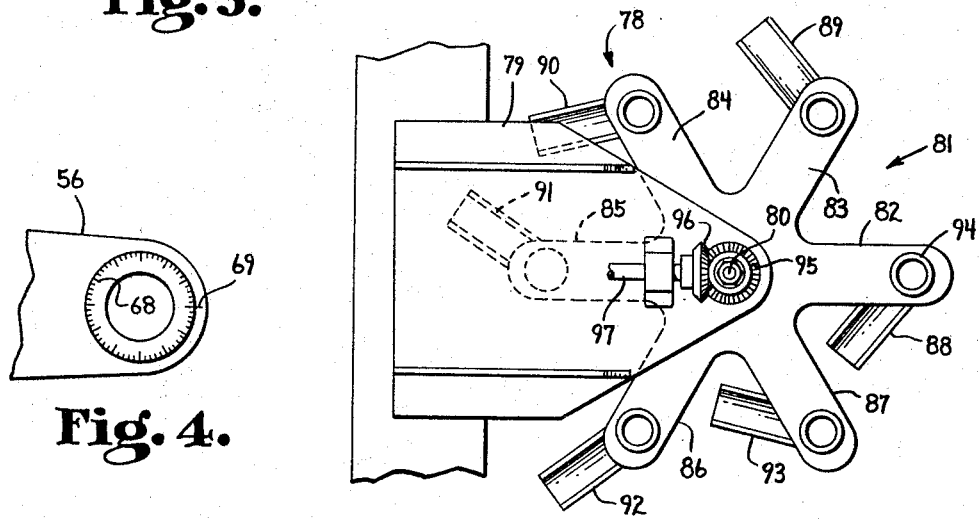
Fig. 4.
Fig. 5.
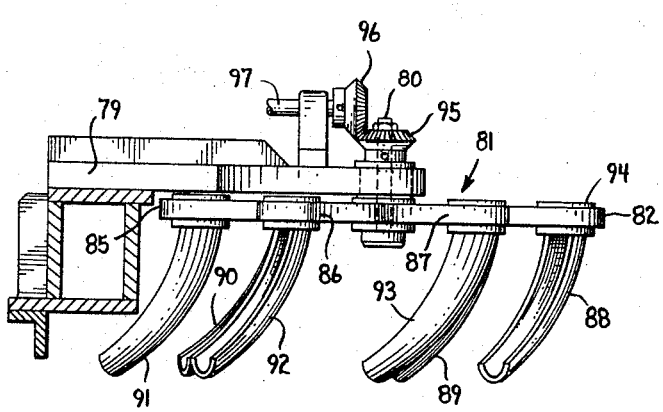
Fig. 6.
INVENTOR
ANTHONY T. ZAPPIA
BY Hood, Gust & Irish
Attorneys

United States Patent Office 3,333,938
Patented Aug. 1, 1967

3,333,938
GLASS FEEDER SCOOP GEAR INDEX
MECHANISM
Anthony T. Zappia, 6230 E. 56th St.,
Indianapolis, Ind. 46226
Filed Dec. 30, 1965, Ser. No. 517,749
4 Claims. (Cl. 65—225)

ABSTRACT OF THE DISCLOSURE

A feeder mechanism for delivering glass gobs selectively from a gob dropper station to chutes leading to a plurality of glass forming machines, the feeder mechanism comprising a rotor carrying a number of scoops equal to the number of such machines, each scoop having an inlet end registrable, once in each revolution of the rotor, with the gob dropper, and an outlet end registrable concurrently with the chute of the corresponding machine, and the scoops being individually movable relative to the rotor. In the preferred form of the invention, each scoop is carried at the distal end of an arm which rotates about the axis of its own proximal end relative to the rotor, as the rotor turns, thereby conserving space for a combination of the feeder mechanism.

---

The present invention relates to feeder mechanism primarily intended for interposition between a fixed gob dropper and a bank of glass forming machines supplied therefrom, and the primary object of the invention is to provide a feeder so constructed as to facilitate the accurate delivery of successive gobs from such a dropper to the several machines in the bank in any desired sequence.

A further object of the invention is to provide, in such a mechanism, a rotor which may be continuously or intermittently driven, a number of scoops carried by said rotor, equal in number to the number of machines in the bank, and arranged for successive registry between a single, stationary gob dropper and feed chutes leading to the respective machines in the bank. Still another object of the invention is to provide, in such a mechanism, simple and readily manipulable adjustment means whereby the several scoops may be individually adjusted relative to the rotor so that each scoop, when in registry with the gob dropper, will also be in registry with the feed chute for the individual machine for which that scoop is designated.

Still another object of the invention is to provide a device of the class described which is so operatively designed and constructed as to require a minimum space for its operation. More particularly, it is an object of the invention to provide such a mechanism in which the several scoops are supported from the rotor upon individual arms so constructed and arranged that each arm with its associated scoop is projected beyond the periphery of the rotor as it approaches the gob dropper and is bodily withdrawn to a position wholly within the periphery of the rotor as it retreats from the gob dropper.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

FIG. 3 is a top plan view, partly in section and drawn to a reduced scale, showing the feeder mechanism of FIGS. 1 and 2 in operative association with a bank of glass forming machines and a series of feeder chutes therefor;

FIG. 4 is a fragmentary top plan view of one arm of the mechanism of FIGS. 1 to 3, illustrating the calibrated collar associated with the scoop carried by said arm;

FIG. 5 is a top plan view of a modified form of feeder mechanism; and

FIG. 6 is a front elevation thereof.

Figure 1:
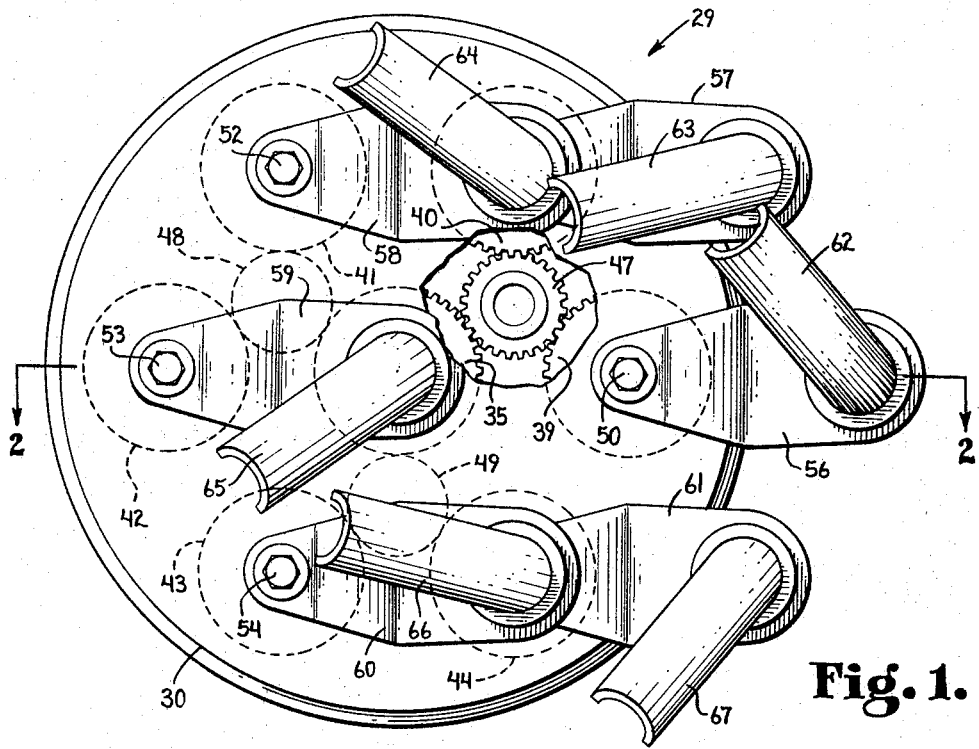
FIG. 1 is a bottom plan view of a preferred form of feeder mechanism constructed in accordance with the present invention.

It is customary in the glass forming industry to arrange a plurality of forming machines in a bank and to feed the same, through an automatic, measuring gob dropper, from a common pool of molten glass. Various expedients, most commonly including a movable conduit leading from the measuring device, are used for conducting molten glass charges successively from such measuring device to the several machines; but all previous expedients for that purpose known to me are subject to numerous operational disadvantages, including inaccuracy in the positioning of the delivery end of such a movable conduit with consequent inefficiency.

According to the present invention, I provide each glass forming machine in a bank with a feed chute having a delivery end at the machine and an inlet end positioned near a fixed gob dropper, the inlet ends of the several feed chutes being arranged in an intimate cluster which is preferably symmetrical with respect to the gob dropper. A rotor is interposed between the gob dropper and said cluster and carries a plurality of longitudinally curved scoops, equal in number to the feed chutes, the mechanism being so arranged and constructed that the inlet ends of the scoops move successively into cooperative registry with the gob dropper, the delivery end of each scoop being located, when its inlet end is in such registry, in cooperative registry with an individual one of the inlet ends of said feed chutes. Of course, the rotor is so timed that each time the inlet end of a scoop comes into registry with the gob dropper, a gob of molten glass is dropped into that chute whereby such gob is led and delivered to the inlet end of the feed chute which corresponds to that scoop.

Referring more particularly to FIGS. 1 to 4, it will be seen that, in FIG. 3, I have suggested a bank of six glass forming machines 10, 11, 12, 13, 14 and 15. The machine 10 is provided with a feed chute 16 having an inlet 17, the machine 11 is provided with a feed chute 18 having an inlet end 19, and similar chutes 20, 22, 24 and 26 having inlet ends 21, 23, 25 and 27 are similarly associated with the respective machines 12, 13, 14 and 15. As is clearly illustrated, the inlet ends of the several feed chutes are arranged in an intimate cluster adjacent a fixed gob dropper 28 which may be of any conventional construction. In the illustrated arrangement, the chute inlets 17, 29 and 21 are arranged on one side of a median line while the inlet ends 23, 25 and 27 are arranged on the other side thereof, the several inlet ends being disposed substantially on an arc centered on the axis of the gob dropper 28.

Figure 2:
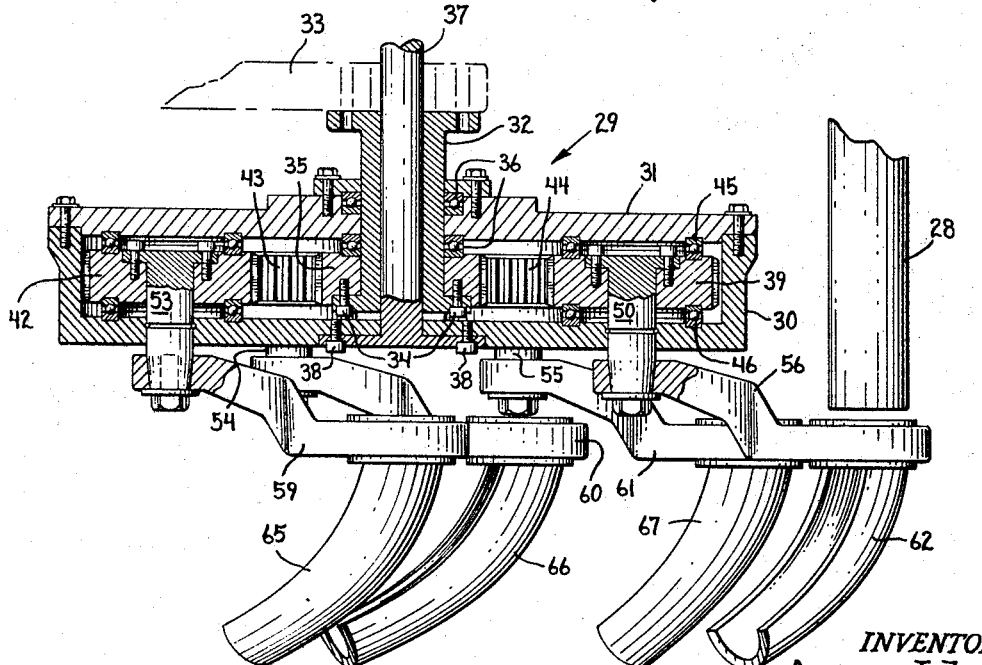
FIG. 2 is a transverse section taken substantially on the line 2—2 of FIG. 1, showing fragments of a gob dropper and a machine feeder chute.

The feed mechanism of this embodiment of the present invention is indicated generally by the reference numeral 29 and, as is perhaps most clearly to be seen in FIG. 2, is interposed between the gob dropper and the several feed chutes. Said mechanism comprises a rotor body 30 which is generally cup-shaped and whose upwardly opening mouth is closed by a cover 31. A sleeve 32 is fixedly supported from stationary bracket means 33, penetrates the cover 31 and supports, within the housing, a pinion 35 secured to said sleeve by suitable fastening means such as the machine screws 34. Thrust bearings 36 provide a journalled support for the rotor 30 upon said sleeve 32.

A drive shaft 37 penetrates the sleeve 32 and is connected to the rotor body by suitable fastening means such as the machine screws 38.

Six gears 39, 40, 41, 42, 43 and 44 are peripherally spaced about the rotor within said body and near the periphery thereof, each gear being journalled in bearings 45 and 46 as is most clearly illustrated in FIG. 2, for rotation relative to said body about an axis radially spaced from, but parallel with, the axis of rotation of the rotor. Three idlers 47, 48 and 49 are similarly journalled within the rotor body, each such idler meshing with the pinion 35 and with two of the said gears. Thus the idler 47 meshes with the gears 39 and 40, the idler 48 meshes with the gears 41 and 42 and the idler 49 meshes with the gears 43 and 44.

As a result of this construction and arrangement, rotation of the rotor under the influence of the drive shaft 37 in one direction or the other will produce synchronous rotation of the gears 39, 40, 41, 42, 43 and 44 in the opposite direction about their respective axes relative to said rotor so that, as said gears travel orbitally about the rotor axis, each will maintain a fixed attitude.

Each such gear fixedly carries a depending shaft penetrating the floor of the rotor housing 30. Thus, shafts 50, 52, 53 and 54 associated respectively with the gears 39, 41, 42 and 43 are to be seen in FIG. 1, while shaft 55 associated with gear 44 (obscured in FIG. 1) is seen in FIG. 2 and the corresponding shaft associated with gear 40 is not seen in any view of the drawings. An arm 56 is fixedly carried by the shaft 50 and similar arms 57, 58, 59, 60 and 61 are similarly carried respectively by the shafts 51, 52, 53, 54 and 55. Each such arm has a length slightly exceeding the radial dimension between its shaft and the axis of the rotor. Near its distal end, each such arm is perforated to receive the upper or inlet end of a scoop which penetrates such perforation. Thus, the arm 56 carries a scoop 62, the arm 57 carries a scoop 63 and similar scoops 64, 65, 66 and 67 are carried, respectively, by the arms 58, 59, 60 and 61. Each scoop is longitudinally curved, is journal mounted in its arm perforation and preferably carries, at its upper end, a calibrated collar 68 arranged in juxtaposition to a reference mark 69 on its supporting arm.

From the above description, it will be seen that, as the drive shaft 37 rotates, the several arms will be carried in an orbital path about the axis of the drive shaft, but without changing their attitudes as illustrated in FIG. 1. As a consequence, if it be assumed that the mechanism 29 is rotating in a clockwise direction as viewed in FIG. 1, it will be seen that as any arm moves from the illustrated position of the arm 58 toward the illustrated position of the arm 57, the distal end of that arm approaches and is then projected outwardly beyond the periphery of the rotor housing 30 until, when that arm reaches the illustrated position of the arm 56, it will be projected to a maximum distance beyond such periphery. As is clearly shown in FIG. 2, the gob dropper 28 is so located that, when any arm reaches the illustrated position of the arm 56, the inlet end of the scoop carried by that arm will be in cooperative registry with the dropper 28 to receive a gob released from said dropper.

As the rotor continues to turn, any arm moving from the illustrated position of the arm 56 toward the illustrated position of the arm 61 will begin to be withdrawn to a position wholly within the periphery of the rotor housing 30 and, as such arm travels from a position intermediate the illustrated positions of the arms 61 and 60, it will remain wholly within the periphery of the rotor housing until it attains a position intermediate the illustrated positions of the arms 58 and 57.

In broken lines in FIG. 3, I have illustrated the arm 56 in fully extended position with the inlet end of its scoop 62 in cooperative registry with the gob dropper 28 and with the outlet end of said scoop in cooperative registry with the inlet end 17 of the chute 16. It will be apparent that, by suitable rotational adjustment of the several scoops about the axes of their respective inlet ends, each can be arranged so that, when its inlet end is in such registry with the gob dropper 28, its outlet end will be in cooperative relation with a selected one of the machine feed chutes. In FIG. 1, I have illustrated one selected arrangement of the several scoops such that the scoop 62 delivers to the chute 16, the scoop 63 delivers to the chute 23, the scoop 64 delivers to the chute 18, the scoop 65 delivers to the chute 25, the scoop 66 delivers to the chute 21 and the scoop 67 delivers to the chute 27; but it will be apparent that any other desired sequence of delivery to the several machines of the bank may be provided for by suitably setting the several scoops, being guided by observation of the calibrated collars 68.

A modified form of feeder mechanism, which is somewhat simpler and less expensive but which necessarily occupies more room, is illustrated in FIGS. 5 and 6. In these views, the reference numeral 78 indicates generally a feeder mechanism which is supported from bracket means 79 in which is journalled a shaft 80 carrying a rotor 81. Said rotor comprises six relatively fixed arms 82, 83, 84, 85, 86 and 87 each of which is perforated, near its distal end, for the reception of the inlet end of a scoop 88, 89, 90, 91, 92 or 93, said scoops being similar in construction to the scoops 62, 63, 64, 65, 66 and 67. As explained in the discussion of the form of invention illustrated in FIGS. 1 to 4, each scoop may preferably have associated therewith a calibrated collar whereby its suitable adjustment to the desired relation to the feed chutes is facilitated. In this form of the invention, the shaft 80 may carry a beveled gear 95 with which meshes a beveled drive pinion 96 carried by a drive shaft 97.

The operation of this form of the invention is similar to that above described, except that the several scoops do not move relative to the rotor as they travel about the axis of the shaft 80, wherefore at least some of said scoops project beyond the distal ends of the rotor arms at times during the rotor cycle. Furthermore, the distance from the axis of rotation of the rotor to the distal end of each arm remains constant throughout the cycle of the rotor, so that clearance all the way around the drive shaft must slightly exceed the distance between the axis of rotation of the drive shaft and the gob dropper 28.

I claim as my invention:

1. For use with a plurality of glass forming machines, each provided with a receiving chute, the inlet ends of said chutes being arranged in an intimate cluster adjacent a single gob dropper, the invention which comprises feeder mechanism interposed between said dropper and said chutes and comprising a rotor, a plurality of scoops, equal in number to said chutes, carried by said rotor, each scoop having an inlet end and an outlet end, the inlet end of each scoop being disposed in cooperative registry with such dropper once in each rotary cycle of said rotor, and the outlet end of each scoop being disposed in cooperative registry with the inlet end of its respective chute whenever its inlet end so registers with said dropper, each scoop depending from said rotor and being longitudinally curved, and each scoop further being mounted in said rotor for angular adjustment about the axis of its own inlet end relative to said rotor.

2. For use with a plurality of glass forming machines, each provided with a receiving chute, the inlet ends of said chutes being arranged in an intimate cluster adjacent a single gob dropper, the invention which comprises feeder mechanism interposed between said dropper and said chutes and comprising a rotor, a plurality of scoops, equal in number to said chutes, carried by said rotor, each scoop having an inlet end and an outlet end, the inlet end of each scoop being disposed in cooperative registry with such dropper once in each rotary cycle of said rotor, and the outlet end of each scoop being disposed in cooperative registry with the inlet end of its respective chute whenever its inlet end so registers with said dropper, each scoop being carried by an arm supported from said rotor for rotation about an axis parallel with but radially offset from the axis of rotation of said rotor, and means for rotating said arms, upon rotation of said rotor, to move the inlet end of each scoop radially outwardly beyond the periphery of said rotor as that scoop approaches said cluster and to withdraw said inlet end of each scoop to within the periphery of said rotor as that scoop retreats from said cluster.

3. For use with a plurality of glass forming machines, each provided with a receiving chute, the inlet ends of said chutes being arranged in an intimate cluster adjacent a single gob dropper, the invention which comprises feeder mechanism interposed between said dropper and said chutes and comprising a rotor, a stationary pinion coaxial with said rotor, a plurality of gears, equal in number to said chutes, peripherally spaced and journal mounted on said rotor for rotation relative thereto about axes parallel with the axis of rotation of said rotor, idlers meshing with said pinion and with said gears to provide driving connections therebetween, an arm for each gear, each arm having a proximal end fixed to its gear and having a distal end, the length of each arm exceeding the radial distance from its gear axis to the periphery of said rotor, and a longitudinally curved scoop depending from and opening through each arm adjacent the distal end thereof, each scoop having an inlet end disposed, once in each rotary cycle of said rotor, in cooperative registry with said dropper and having a delivery end located, when its inlet end is so disposed, in cooperative registry with the inlet end of an individual one of said chutes.

4. The invention of claim 3 in which each scoop is mounted in its arm for angular adjustment about the axis of its own inlet end relative to its arm.

References Cited
UNITED STATES PATENTS 3,147,102   9/1964   Trudeau _____ 65—225

EVON C. BLUNK, *Primary Examiner.*

H. C. HORNSBY, *Assistant Examiner.*